United States Patent
Yeh et al.

(10) Patent No.: US 6,877,085 B2
(45) Date of Patent: Apr. 5, 2005

(54) MECHANISM FOR PROCESSING SPECLATIVE LL AND SC INSTRUCTIONS IN A PIPELINED PROCESSOR

(75) Inventors: Tse-Yu Yeh, Milpitas, CA (US); Po-Yung Chang, Saratoga, CA (US); Mark H. Pearce, San Francisco, CA (US); Zongjian Chen, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 613 days.

(21) Appl. No.: 10/068,286

(22) Filed: Feb. 6, 2002

(65) Prior Publication Data

US 2003/0105943 A1 Jun. 5, 2003

Related U.S. Application Data

(60) Provisional application No. 60/334,394, filed on Nov. 30, 2001.

(51) Int. Cl.$^7$ ............................................. G06F 9/312
(52) U.S. Cl. .................................................... 712/216
(58) Field of Search ............................... 712/216, 214, 712/215

(56) References Cited

U.S. PATENT DOCUMENTS

| | | | | |
|---|---|---|---|---|
| 5,694,553 A | * | 12/1997 | Abramson et al. ............ 712/23 |
| 5,781,790 A | * | 7/1998 | Abramson et al. ............ 712/23 |
| 5,881,262 A | * | 3/1999 | Abramson et al. ........... 712/216 |
| 5,937,430 A | * | 8/1999 | Saitoh et al. ................ 711/138 |
| 6,298,436 B1 | * | 10/2001 | Kahle et al. ................. 712/220 |
| 6,687,809 B2 | * | 2/2004 | Chowdhury et al. ......... 712/216 |
| 6,715,062 B1 | * | 3/2004 | Moore ......................... 712/227 |
| 6,725,338 B2 | * | 4/2004 | Gomez et al. .............. 711/137 |
| 6,728,867 B1 | * | 4/2004 | Kling .......................... 712/216 |
| 6,748,501 B2 | * | 6/2004 | Arimilli et al. ............. 711/155 |
| 6,769,057 B2 | * | 7/2004 | Steely, Jr. .................... 712/216 |

* cited by examiner

*Primary Examiner*—Eric Coleman
(74) *Attorney, Agent, or Firm*—Garlick Harrison & Markison LLP (57) ABSTRACT

A processor includes a first circuit and a second circuit. The first circuit is configured to provide a first indication of whether or not at least one reservation is valid in the processor. A reservation is established responsive to processing a load-linked instruction, which is a load instruction that is architecturally defined to establish the reservation. A valid reservation is indicative that one or more bytes indicated by the target address of the load-linked instruction have not been updated since the reservation was established. The second circuit is coupled to receive the first indication. Responsive to the first indication indicating no valid reservation, the first circuit is configured to select a speculative load-linked instruction for issued. The second circuit is configured not to select the speculative load-linked instruction for issue responsive to the first indication indicating the at least one valid reservation. A method is also contemplated.

19 Claims, 6 Drawing Sheets

MECHANISM FOR PROCESSING SPECLATIVE LL AND SC INSTRUCTIONS IN A PIPELINED PROCESSOR

This application claims benefit of priority to Provisional Patent Application Ser. No. 60/334,394, filed Nov. 30, 2001.

BACKGROUND OF THE INVENTION

1. Field of the Invention

This invention is related to the field of processors and, more particularly, to multiprocessor synchronization mechanisms in processors.

2. Description of the Related Art

Processors designed for use in multiprocessing systems typically support some sort of mechanism for synchronizing processes executing on the various processors. For example, certain sections of code may be designated as "critical sections". Critical sections may update variables shared by the processes, read or write files, etc. Typically, the processes are synchronized such that at most one process at any given time is executing the critical section. As another example, the processes may share certain data areas in memory. Access to the shared data areas may be controlled in a similar fashion, synchronizing such that at most one process has access (or perhaps at most one process has write access, with other processes possibly having read-only access) to the shared data area at any given time.

Support for synchronization has been provided by processors in the form of an atomic read-modify-write of a memory location. The atomic read-modify-write can be used to implement various synchronization primitives such as test and set, exchange, fetch and add, compare and swap, etc. Synchronization may be managed by using atomic read-modify-writes to designated memory locations to communicate whether or not a critical section or shared data area is available, to indicate which process currently has access to the critical section or shared data area, etc.

Some processors may support atomic read-modify-writes using a lock mechanism. With a lock mechanism, when a processor accesses a memory location, other access to that memory location is prevented until the processor releases the lock. The atomicity of the read-modify-write operation to the memory location is guaranteed by preventing other processors from accessing that memory location. Lock mechanisms may be problematic in practice. For example, if the lock is implemented by locking a resource for accessing memory (e.g. a shared bus), deadlock may result (especially in coherent systems). Lock mechanisms for larger systems (e.g. multiple levels of interconnect between processors) may be problematic to implement.

Another approach for providing an atomic read-modify-write mechanism is the load-linked/store conditional mechanism. In this mechanism, two types of instructions are provided: the load-linked and the store conditional. Generally, a load-linked instruction and a store conditional instruction to the same address are used in pairs. The load-linked instructions operate similar to typical load instructions, but also cause the processor to monitor the target address of the load instruction (the address of the data accessed by the load). The store conditional instruction conditionally stores to the target address based on whether or not the target address is updated by another processor/device between the load-linked instruction and the store conditional instruction. Other conditions may cause the store not to occur as well. The store conditional may provide an indication of whether or not the store was performed, which may be tested by subsequent instructions to either branch back to the load-linked instruction to attempt the read-modify-write operation again (if the store was not successfully performed) or to continue processing (if the store was successfully performed). With the load-linked/store conditional mechanism, other processors may access the memory location for which the atomic read-modify-write is being attempted. If a modification occurs, the load-linked/store conditional sequence is repeated. When the store conditional completes successfully, an atomic read-modify-write of the location has been performed.

Since the processor resources for monitoring the target addresses of load-linked instructions is limited, speculative execution of load-linked instructions may be problematic. If a speculative load-linked instruction causes the processor to begin monitoring its target address and the speculative load-linked instruction is later canceled (e.g. due to branch misprediction or exception), a subsequent store conditional instruction may incorrectly complete successfully based on the target address of the speculative load-linked instruction. Similarly, a speculative load-linked instruction may cause the processor to cease monitoring the target address of a previous (non-speculative) load-linked instruction. The store conditional corresponding to the previous load-linked instruction may complete unsuccessfully in this case.

SUMMARY OF THE INVENTION

A processor is contemplated, comprising a first circuit and a second circuit. The first circuit is configured to provide a first indication of whether or not at least one reservation is valid in the processor. A reservation is established responsive to processing a load-linked instruction, which is a load instruction that is architecturally defined to establish the reservation. A valid reservation is indicative that one or more bytes indicated by the target address of the load-linked instruction have not been updated since the reservation was established. The second circuit is coupled to receive the first indication. Responsive to the first indication indicating no valid reservation, the first circuit is configured to select a speculative load-linked instruction for issued. The second circuit is configured not to select the speculative load-linked instruction for issue responsive to the first indication indicating the at least one valid reservation.

A method is also contemplated. Whether or not at least one reservation is valid in a processor is determined. Responsive to no valid reservation, a speculative load-linked instruction is selected for issue. Responsive to at least one valid reservation, the speculative load-linked instruction is not selected for issue.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Figure 1:
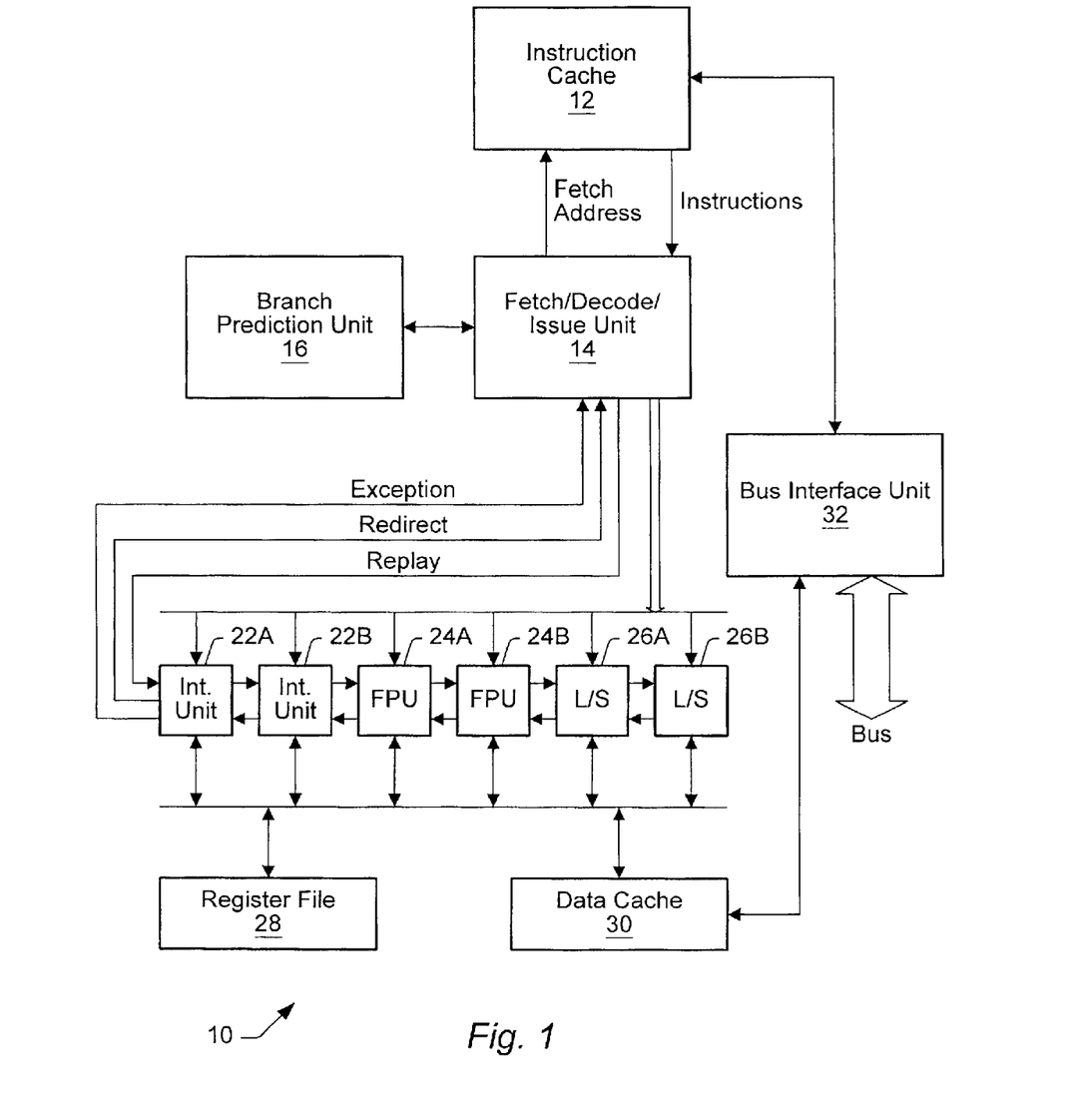
FIG. 1 is a block diagram of one embodiment of a processor.

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A–22B, 24A–24B, and 26A–26B. Additionally, the fetch/issue/decode unit 14 is coupled to receive a redirect indication from the integer unit 22A and exception indications from the execution units 22A–22B, 24A–24B, and 26A–26B. The fetch/issue/decode unit 14 is coupled to provide a replay indication to the execution units 22A–22B, 24A–24B, and 26A–26B. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more issue queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

The redirect, replay, and exception indications may be used in the management of speculative instruction execution and dependency management, as described in more detail below. Generally, the redirect indication may indicate whether or not a predicted branch was predicted correctly. Each of execution units 22A–22B, 24A–24B, and 26A–26B may indicate whether or not an instruction experiences an exception using the corresponding exception indication. The replay indication may be provided by the fetch/decode/issue unit 14 if a replay condition is detected for an instruction.

Speculative Load-Linked/Store Conditional Handling

The processor 10 may be configured to speculatively issue load-linked/store conditional instructions. In one embodiment, the processor 10 employs one or more storage devices for storing target addresses of previously processed load-linked instructions as well as corresponding reservation indications indicative of whether or not a valid reservation is being maintained by the processor 10 for the corresponding target address. The reservation indications may be in one of at least two states: a first state indicating that the reservation is valid and a second state indicating that the reservation is invalid. If the reservation indication in each storage device is in the second state (no valid reservations), a speculative load-linked instruction may be issued. If at least one reservation indication is in the first state (valid reservation), then a speculative load-linked instruction is not issued. In one embodiment, if a valid reservation is being maintained by the processor 10, a speculative load-linked instruction is not issued until the instructions prior to that load-linked instruction have graduated. Additionally, in one embodiment having pipelined processing of load instructions, if a load-linked instruction is in the pipeline, a speculative load-linked instruction is not issued.

Accordingly, the processor 10 may speculatively issue the first load-linked instruction encountered when no valid reservations are being maintained. If the first load-linked instruction misses the data cache 30, the miss processing may begin speculatively for the first load-linked instruction in a sequence of one or more load-linked instructions. In some code sequences, the latency of the first load-linked instruction may be important to performance of the code sequence.

During processing of the speculative load-linked instruction, a reservation may be established in the storage devices. Since the load-linked instruction is speculative, it may not complete execution (e.g. it may be canceled before the graduation stage, at which the load-linked instruction is committed to architected state). For example, if the load-linked instruction is subsequent to a mispredicted branch instruction, the redirect caused when the branch misprediction is detected may cause the load-linked instruction not to complete. Additionally, in one embodiment, the processor 10 supports the replay of instructions if dependencies are not resolved for a given instruction by the time that the instruction reaches the register file read stage (instead of stalling the pipeline and waiting for the operands). If a load-linked instruction is replayed (or a preceding instruction is replayed), the load-linked instruction does not complete execution. If the load-linked instruction experiences an exception (or a preceding instruction experiences an exception), the load-linked instruction does not complete execution.

If a load-linked instruction does not complete execution, the processor 10 may invalidate each of the valid reservations. Since speculative load-linked instructions are not issued if there are valid reservations, the reservations being invalidated may generally be speculative reservations. In this manner, incorrect successfully completions of store conditional instructions may be avoided.

In one embodiment, the store conditional instruction may also be speculatively issued. The store conditional instruction may be processed to the graduation stage without updating the data cache 30. If the store conditional is ready to graduate, the reservations may be checked to see if the store conditional is successful. In one embodiment, the processor 10 recycles the store conditional instruction from the graduation stage back into the load/store pipeline again. During the second pass, the store may check the reservations and update the cache. The load/store pipeline may signal the success or failure to the issue logic, which may issue a pseudo-op to update the destination register of the conditional store with an indication of the success/failure of the conditional store.

For the discussion of one embodiment of the processor 10 below (with regard to FIGS. 2–5), an example using the MIPS instruction set (and the LL and SC instructions as examples of the load-linked and store conditional instructions, respectively) will be used. However, other embodiments may implement other instruction sets, including other examples of a load-linked and store conditional instruction. The details of the instructions may vary. For example, the store conditional instructions in the PowerPC instruction set are the conditional store word (stwcx.) or conditional store doubleword (stdcx.) instructions. The success or failure of the stwcx. and stdcx. instructions is reported in a condition code register. In contrast, the SC instruction in the MIPS instruction set reports the success or failure by writing a one or a zero (respectively) to the register sourcing the store data for the SC instruction.

Generally, as used herein, a "load-linked" instruction is a load instruction which is architecturally defined (by the processor architecture implemented by the processor 10) to establish a reservation for the target address of the load-linked instruction. For example, in the MIPS instruction set, an example of a load-linked instruction may be the LL instruction. Other instruction sets may implement examples of load-linked instructions. For example, the PowerPC instruction set includes a load word and reserve (lwarx) instruction and a load doubleword and reserve (ldarx) instruction, which may be examples of load-linked instructions. Any load instruction which establishes a reservation for the target address of that load instruction may be a load-linked instruction. As used herein, a "store conditional" instruction is a store instruction which is architecturally defined to perform the store conditionally dependent on a valid reservation existing in the processor. Specifically, the store is performed (the memory location specified by the target address of the store is updated) if a valid reservation exists and the store is not performed (the memory location specified by the target address of the store is not updated) if a valid reservation does not exist. As mentioned above, the SC instruction of the MIPS instruction set and the conditional store word (stcwx.) and a conditional store doubleword (stcdx.) instructions of the PowerPC instruction may be examples of a store conditional instruction. Any store instruction which is conditional on a valid reservation may be store conditional instruction. In some embodiments, the store conditional instruction may report the success or failure of the store (e.g. by updating the source register for the store conditional instruction, a condition code register, or other mechanisms).

As used herein, if a processor has a "reservation" for a target address, the processor is monitoring for updates to the target address, separate from monitoring the data cache 30 for coherency reasons. A reservation is established in response to a load-linked instruction. A valid reservation is a reservation which: (i) has been established; (ii) has not been invalidated due to an update to the target address by another processor or device. In other words, a valid reservation is indicative that one or more bytes indicated by the target address of the load-linked instruction have not been updated since the reservation was established. A valid reservation may also be invalidated due to the success of a corresponding store conditional instruction. Other causes may invalidate a reservation, in some embodiments. For example, if the cache line including the target address is evicted from the data cache, the reservation may be invalidated. If an exception is experienced, the reservation may be invalidated. In various embodiments, the granularity on which the reservation is maintained may be varied. For example, the granularity may be the size of the data accessed (e.g. a word), or may be a larger granularity (e.g. a cache block containing the word). If a larger granularity is used, updates to the target address or to other addresses within the granularity may cause the reservation to be invalidated.

Turning next to FIGS. 2–5, a specific example of the processor 10 implementing the MIPS instruction set (including the LL and SC instructions) will be described. For this embodiment, several registers are used to maintain multiple reservations concurrently (e.g. 4 in one example). In one particular embodiment, the data cache 30 comprises multiple banks and a reservation is maintained for each bank of the data cache 30. Other embodiments may maintain as few as one valid reservation or as many reservations as desired. Any type of storage device (e.g. memory such as random access memory (RAM), a set of flops, latches, etc. may be used). Additionally, the reservation indication in each storage device is illustrated as a bit in the example below (the LL bit). The bit being set indicates a valid reservation (e.g. the first state mentioned above) and the bit being clear indicates an invalid reservation (e.g. the second state mentioned above). Other embodiments may reverse the meaning of the set and clear states of the bit or may use other indications, as desired.

Figure 2:
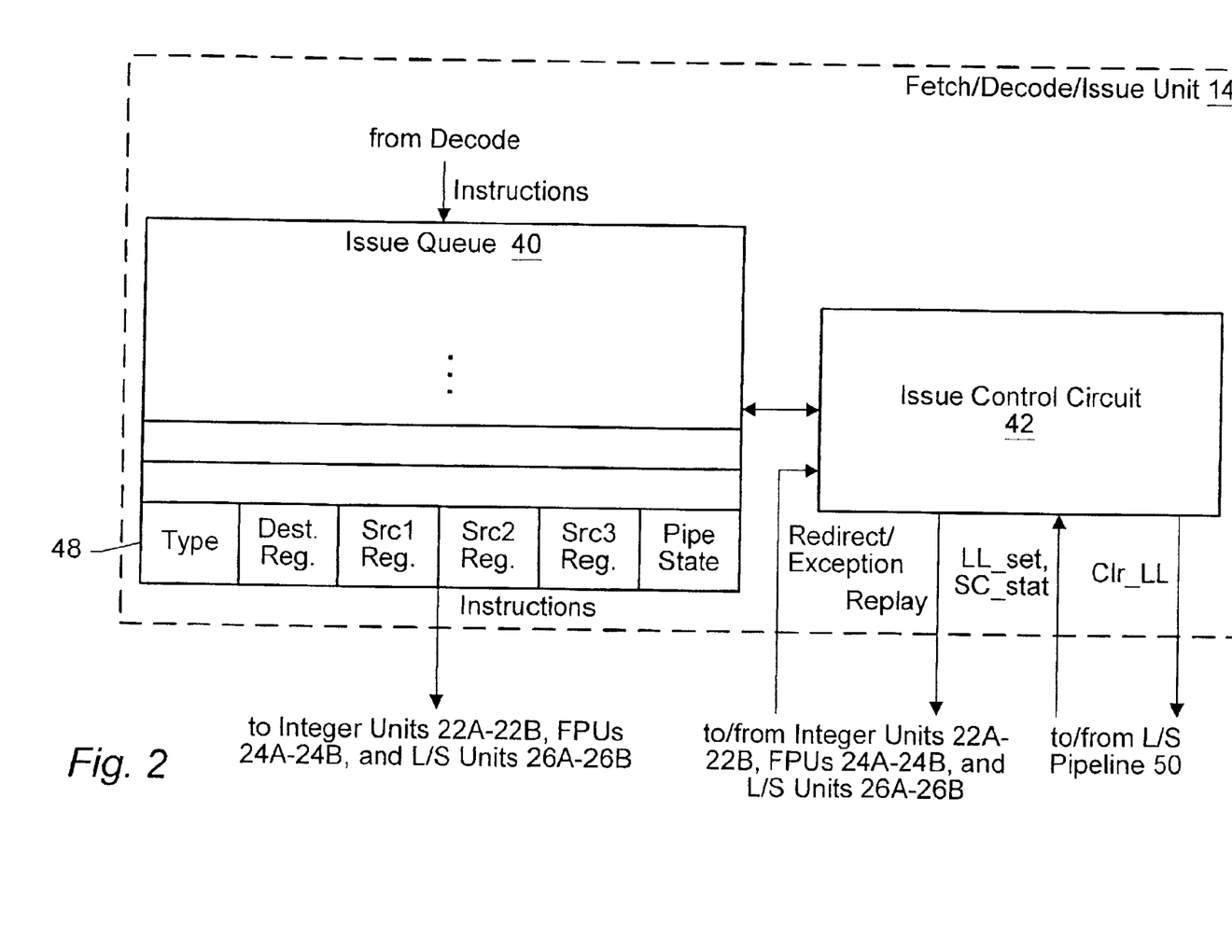
FIG. 2 is a block diagram of one embodiment of issue logic for the processor shown in FIG. 1.
Figure 3:
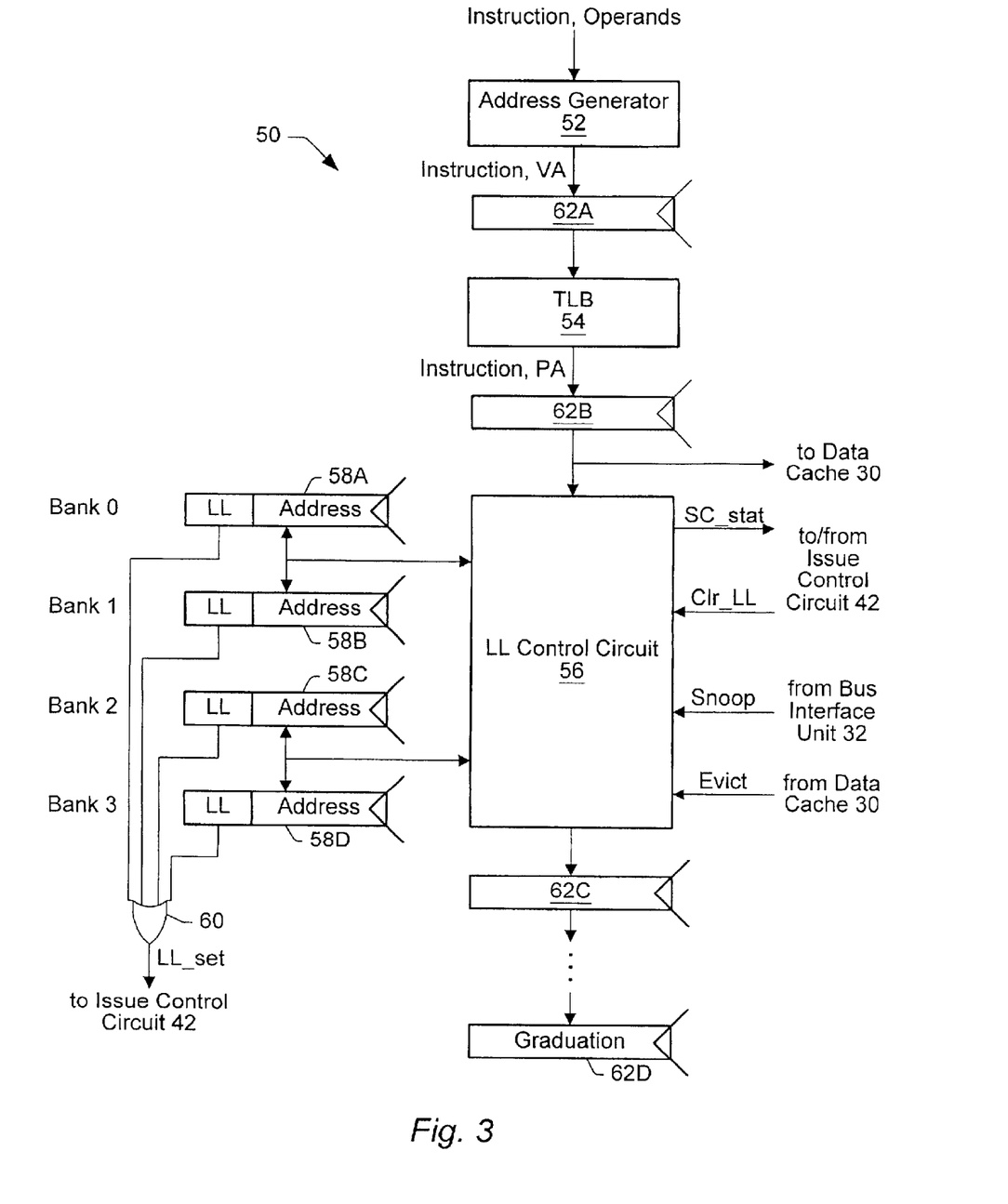
FIG. 3 is a block diagram of one embodiment of a load/store pipeline for the processor shown in FIG. 1.

Turning now to FIG. 2, a block diagram of one embodiment of a portion of the fetch/decode/issue unit 14 is shown. Other embodiments are possible and contemplated. In the embodiment of FIG. 2, the fetch/decode/issue unit 14 includes an issue queue 40, and an issue control circuit 42. The issue queue 40 is coupled to receive instructions from the decode circuitry (not shown), and is configured to provide instructions to the integer execution units 22A–22B, the floating point execution units 24A–24B, and the load/store units 26A–26B. The issue queue 40 is coupled to the issue control circuit 42, which is further coupled to receive the redirect indication and the exception indications shown in FIG. 1, and to provide the replay indication shown in FIG. 1. Additionally, the issue control circuit 42 is coupled to receive an LL_set indication and an SC_stat indication from the load/store pipeline (an embodiment of which is illustrated in FIG. 3) and to provide a Clr_LL indication to the load/store pipeline.

The issue queue 40 receives decoded instructions from the decode logic and queues the instructions at least until they are issued. In one embodiment, the issue queue 40 queues the instructions until they are graduated. The issue queue comprises a plurality of entries for storing instructions and related information. Certain fields of information in an exemplary entry 48 are shown in FIG. 2. The type of instruction is stored in a type field of the entry. The type may be the opcode of the instruction (possibly decoded by the decode logic), or may be a field which indicates instruction types used by the issue control circuit 42 for selecting instructions for issue. The destination register number is stored in a dest. reg. field. Similarly, the source register numbers may be stored in the src1 reg. field, the src2 reg. field, and the src3 reg. field. Most instructions may have at most two source register operands indicated by the register numbers in the src1 and src2 reg. fields. However, the floating point multiply-add instruction may have three source operands (e.g. src1 and src2 may be the multiplicands and src3 may be the add operand).

Finally, a pipe state field is shown. The pipe state stored in the pipe state field may track the pipe stage that the corresponding instruction is in. The pipe state may be represented in any fashion. For example, the pipe state may be a bit vector with a bit corresponding to each pipeline stage. The first bit may be set in response to the issuance of the instruction, and the set bit may be propagated down the bit vector on a cycle-by-cycle basis as the instruction progresses through the pipeline stages. Alternatively, the pipe state may be a counter which is incremented as the instruction progresses from pipeline stage to pipeline stage. In one embodiment, the pipelines in the integer, floating point, and load/store execution units do not stall (instruction replay may be used where an instruction may otherwise stall in the pipeline). Accordingly, the pipe state may change to the next stage each clock cycle until the instruction is either canceled or graduates.

The pipe state may be used by the issue control circuit 42 to determine which pipeline stage a given instruction is in. Thus, the issue control circuit 42 may determine when source operands are read for a given instruction, when the instruction has reached the replay or graduation stage, etc. Other embodiments may track the pipeline stage for each instruction in other fashions as well.

The issue control circuit 42 scans the instructions in the issue queue 40 and selects instructions for issue to the integer execution units 22A–22B, the floating point execution units 24A–24B, and the load/store units 26A–26B. In one embodiment, the issue control circuit 42 may implement one or more scoreboards for dependency management, and the selection of instructions may be affected by the scoreboards maintained by the issue control circuit 42.

If an instruction is selected for issue, the issue control circuit 42 may signal the issue queue 40 to output the instruction to the unit selected by the issue control circuit 42 for executing the corresponding instruction. Load/store instructions are issued to one of the load/store units 26A–26B. Integer instructions are issued to one of the integer execution units 22A–22B. In the present embodiment, certain integer instructions may be issued to either the load/store units 26A–26B or the integer execution units 22A–22B (e.g. instructions which may be executed using the address generation hardware in the load/store pipeline, such as add instructions). Floating point instructions are issued to the floating point execution units 24A–24B.

Generally, the issue control circuit 42 attempts to concurrently issue as many instructions as possible, up to the number of pipelines to which the issue control circuit 42 issues instructions (e.g. 6 in this embodiment). In some embodiments, the maximum number of concurrently issued instructions may be less than the number of pipelines (e.g. 4 in one embodiment).

The issue control circuit 42 may apply various issue criteria to select LL and SC instructions for issue. The issue criteria for LL and SC instructions may include checking scoreboards for dependencies (or other dependency management mechanisms), resource availability for execution, etc., similar to other instructions. Additionally, the issue criteria for speculative LL instructions may include whether or not a valid reservation is currently maintained by the processor 10. In one embodiment, the issue control circuit 42 is coupled to receive an LL_set indication indicative of whether or not one or more valid reservations are maintained (indicated by a corresponding LL bit being set, as mentioned above). If at least one LL bit is set (at least one reservation is valid), then the issue control circuit 42 may not select the speculative LL instruction for issue. If all LL bits are clear, the control circuit 42 may select the speculative LL instruction for issue.

The LL_set indication is provided by the load/store pipeline. The load/store pipeline (an example of which is shown in FIG. 3) may be implemented in the load/store units 26A–26B, or a combination of the load/store units 26A–26B and data cache 30. There may be more than one pipeline (e.g. one pipeline per load/store unit 26A–26B). Generally, the load/store pipeline includes circuitry to generate the LL_set indication from the LL bits in the reservation registers. In embodiments employing only one reservation register, the LL_set indication may be the LL bit from the reservation register. In one embodiment, the LL_set indication is a signal asserted to indicate that at least one LL bit is set and deasserted to indicate that all LL bits are clear. Other embodiments may use other indications (e.g. the number of LL bits which are set), if desired.

An additional issue criteria for speculative LL instructions for pipelined embodiments is that no LL instructions are in the pipeline (also referred to as "in flight"). If an LL instruction is in the pipeline, it will set an LL bit when it reaches the pipeline stage in which the reservation registers are updated (e.g. the cache access stage, in one embodiment). Thus, this issue criteria may be viewed as an extension of the criteria that a speculative LL instruction is not issued if at least one LL bit is set in the reservation registers. In one embodiment, the issue control circuit 42 may determine if an LL instruction is in the pipeline from the pipe state and type fields in the issue queue 40. Other embodiments may receive information from the load/store pipelines as to whether or not LL instructions are in the pipeline, or use any other mechanism for tracking LL instructions in the pipeline.

As mentioned above, SC instructions may generally be issue speculatively. Accordingly, for this embodiment, no additional issue criteria may be applied to SC instructions. In one embodiment, the issue of an SC instruction may cause the issue control circuit 42 to inhibit issue of subsequent load/store instructions until the SC completes (successfully or unsuccessfully). As mentioned above, in one implementation the SC instruction passes through the load/store pipeline to the graduation stage, then passes through the load/store pipeline again as a graduated SC and checks the cache and LL bit to determine if the SC completes successfully. The load/store pipeline may transmit an SC_stat indication to indicate the status of the SC instruction. The SC_stat indication may be a signal (e.g. asserted to indicate success and deasserted to indicate failure) which may be qualified by the issue control circuit 42 detecting a graduated SC instruction in the appropriate pipeline stage (e.g. the cache access stage). For example, the issue control circuit 42 may use the pipe state information to qualify the SC_stat signal. Other embodiments may use multiple signals for the SC_stat indication to indicate whether or not status is being reported in addition to the status itself. Depending on the SC_stat indication, the issue control circuit 42 may cause the issuance of one of two pseudo ops which write the source register of the data for the SC instruction with a 1 (to indicate success) or a 0 (to indicate failure). Other embodiments may update the register in other fashions.

The issue control circuit 42 receives exception and redirect indications from the execution units, and detects replay scenarios (e.g. due to unresolved dependencies for instructions in the pipeline). Other embodiments may have the execution units detect replay scenarios as well. The issue control circuit 42 may update the pipe state of instructions which are cancelled due to the exception, redirect, or replay. Additionally, the issue control circuit 42 may detect whether or not an LL instruction is cancelled due to the exception, redirect, or replay. In the case or the exception or replay, the exception or replay may be detected for the LL instruction itself, or for a preceding instruction in program order. The redirect may be for a mispredicted branch instruction which precedes the LL instruction in program order. In each case, the LL instruction does not complete execution. Accordingly, the LL bit set in response to the LL instruction should be cleared. In the present embodiment, the issue control circuit 42 transmits a Clr_LL indication to the load/store pipeline to cause the circuitry managing the reservation registers to clear the LL bits in the reservation register.

While the issue control circuit 42 detects cancelled LL instructions in this embodiment, other embodiments are contemplated in which the load/store pipeline(s) detect the canceled LL instruction and clear the LL bits. While one issue queue 40 is illustrated in the present embodiment, other embodiments may use multiple issue queues for different pipelines or different types of instructions. Various embodiments may employ in order or out of order issue, as desired. Issue may be to reservation stations for some embodiments of out of order execution (either centralized or distributed).

Turning now to FIG. 3, a block diagram of one embodiment of a load/store pipeline 50 is shown. Other embodiments are possible and contemplated. In the embodiment of FIG. 3, the pipeline 50 is coupled to receive an instruction (or corresponding control information such as whether the instruction is a load or store, LL or SC, etc.) and operands from the issue stage of the pipeline (in which the issue control circuit 42 reads the instruction from the issue queue 40 and the operands are read from the register file 28). The pipeline 50 may be implemented in one or both of the load/store units 26A–26B, or a combination of one or both of the load/store units 26A–26B and the data cache 30. In the embodiment of FIG. 3, the pipeline 50 includes an address generator 52, a translation lookaside buffer 54, an LL control circuit 56, a set of reservation registers 58A–58D, and an LL_set circuit 60. Various elements in FIG. 3 are separated by pipeline storage devices such as storage devices 62A–62D shown in FIG. 3 to illustrate the pipeline stages for the illustrated embodiment. The pipeline storage devices may be latches, flops, registers, or any other form of storage, as desired.

The address generator 52 includes hardware (e.g. an adder) to generate the virtual target address (VA) of the instruction. Generally, the operands may include one or more address operands to be added to produce the VA. The operands may include register values, a displacement encoded into the instruction itself, etc. The VA and the instruction are provided to the next pipeline stage, which includes the TLB 54. The TLB 54 caches virtual to physical translations. If the TLB 54 is storing a virtual to physical translation corresponding to the VA, the TLB 54 outputs the corresponding physical address (PA). If the TLB 54 is not storing a virtual to physical translation, then a table walk of the address translation tables (stored in memory) is performed to reload a translation into the TLB 54. In one embodiment, the table walk is performed in software and an exception is signaled for a load/store instruction which misses the TLB 54. In other embodiments, the table walk may be performed in hardware.

The PA and instruction are provided to the next pipeline stage, at which the cache access occurs. The PA is transmitted to the data cache 30 for lookup. Additionally, the PA and instruction are provided to the LL control circuit 56. If the instruction is an LL instruction, the LL control circuit 56 updates one of the reservation registers 58A–58D with the PA and sets the LL bit in that register. Particularly, in the illustrated embodiment, one reservation register 58A–58D is assigned to each bank of the data cache 30 (i.e. the data cache 30 includes 4 banks in the illustrated embodiment). Reservation register 58A is assigned to bank 0, reservation register 58B is assigned to bank 1, etc., as shown in FIG. 3. While 4 banks are used in the present embodiment, each assigned a different reservation register 58A–58D, other embodiments may vary the number of banks. For this embodiment, the LL control circuit 56 determines the bank accessed by the LL instruction and updates the corresponding reservation register 58A–58D.

In one embodiment, address bits are used to select which bank is accessed in the data cache 30. The LL control circuit 56 may use the same address bits to select which of the reservation registers 58A–58D to update. In other embodiments, the bank may be determined in different ways. For example, a set associative embodiment of the data cache 30 may have different ways in different banks. In such an embodiment, the LL control circuit 56 may receive a way indication from the data cache 30 identifying the way that is hit by a given address, and the way indication may be used to select the reservation register 58A–58D to be updated.

The LL control circuit 56 may also respond to an SC instruction which is passing through the pipeline 50 a second time after successfully reaching the graduation stage. The SC instruction may be reinserted in the pipeline at any stage (e.g. the issue stage, the address generation stage, the TLB stage, or the cache access stage). If a graduated SC instruction occurs, the LL control circuit 56 may check the PA of the SC instruction against the address in the reservation register 58A–58D of the bank accessed by the SC instruction, as well as the corresponding LL bit in that reservation register. If the addresses match and the LL bit is set, the SC instruction succeeds. Otherwise, the SC instruction fails. The LL control circuit 56 may generate the SC_stat indication accordingly.

The instruction passes from the cache access stage to the next stage (not shown in FIG. 3). The next stage may, in one embodiment, be the stage at which branch redirect and replay is signaled. Other embodiments may detect these events at other stages. The load/store pipeline 50 may include zero or more additional stages (not shown) before the instruction reaches the graduation stage (illustrated by pipeline storage device 62D in FIG. 3). The graduation stage is the stage at which exceptions are reported for an instruction (if any) and, if no exceptions for previous instructions or the instruction prevent it, the instruction results are committed to architected state (e.g. registers in the register file 28 or, in the case of store instructions, the stage at which the memory update may be committed). The actual update may be delayed, but may not be canceled after graduation occurs.

Since the reservation registers 58A–58D are updated in response to an LL instruction prior to the graduation of that instruction, the update is speculative if the LL instruction is speculative. Accordingly, in the illustrated embodiment, the issue control circuit 42 detects the cancellation of a speculative LL instruction and generates the Clr_LL indication to the LL control circuit 56. If the Clr_LL indication is received (e.g. a signal asserted to indicate that the LL bits are to be cleared), the LL control circuit 56 clears each of the LL bits in the reservation registers 58A–58D.

The LL control circuit 56 also receives a snoop input from the bus interface unit 32 in this embodiment. The snoop input may include the address snooped from the bus, as well as the type of transaction or the type of snoop to perform. If the type of transaction or snoop indicates that the address may be updated by the master on the bus (which may be another processor or any other device in the system with the processor 10), and the processor 10 has a valid reservation for the address, the reservation is invalidated (e.g. the LL bit is cleared). Viewed in another way, any type of transaction or snoop that indicates that the processor 10 is allowing another master to take exclusive access to the cache block including the address for which the processor 10 has a valid reservation may cause the reservation to be invalidated. For example, a write transaction or a read to modify transaction may cause the reservation to be invalidated. A snoop that invalidates the cache block corresponding to the address may cause the reservation to be invalidated.

The LL control circuit 56 compares the snoop address to the addresses in the reservation registers 58A–58D. If a match is detected in one of the reservation registers 58A–58D, the LL control circuit 56 clears the LL bit in that reservation register 58A–58D.

In one embodiment, the eviction of the cache block corresponding to the address in one of the reservation registers 58A–58D causes the reservation to be invalidated. Accordingly, the illustrated embodiment includes an evict input from the data cache 30. The evict input may include a signal indicating that an eviction is occurring (e.g. to store data corresponding to a cache miss) and the address of the cache block being evicted. The LL control circuit 56 compares the address to the addresses stored in the reservation registers 58A–58D and, if a match is found in one of the reservation registers 58A–58D, clears the LL bit in that reservation register 58A–58D.

The LL_set circuit 60 is configured to generate the LL_set signal for the issue control circuit 42. In the illustrated embodiment, in which the reservation indications are the LL bits and the LL bit being set indicates a valid reservation, the LL_set signal may be the logical OR of the LL bits. Thus, the LL_set signal may be asserted at a logical one and deasserted at a logical zero. If the opposite definition of asserted and deasserted is used, the LL_set circuit 60 may perform a logical NOR. Various logic circuits may be used dependent on the logical sense of the LL bits and the LL_set signal. Still further, other embodiments may use other reservation indications and LL_set indications, leading to other logical circuits. Any Boolean equivalents may also be used.

It is noted that, in other embodiments, a single input may be used for both evicts and snoops, if desired. It is noted that snoop or evict addresses may be defined to match the reservation addresses if the addresses identify the same cache block (e.g. the granularity of the compare may be the cache block). If snoops are performed on a different granularity than the cache block, the snoop granularity may be used for the snoops. Generally, the least significant bits of the reservation address which define an offset within the cache block or snoop block may be ignored in the comparison.

It is noted that, in the embodiment of processor 10 shown in FIG. 1, two load/store units 26A–26B are illustrated. In such an embodiment, two load/store instructions may be processed in parallel. Thus, there may be two pipelines similar to load/store pipeline 50. The two pipelines may share the LL control circuit 56 and reservation registers 58A–58D. In embodiments including more than two load/store units 26A–26B, additional load/store pipelines similar to pipeline 50 may be included for each additional unit. Other embodiments may include a single pipeline 50 for a single load/store unit.

In the illustrated embodiment, the load/store pipeline 50 includes an address generation stage, a TLB stage, a cache access stage, a replay stage, and a graduation stage (which may be one or more stages away from the replay stage). Other embodiments may implement a different pipeline or no pipeline at all, as desired. The division of pipeline stages may differ. For example, the TLB lookup may be performed in parallel with the cache access and the TLB stage may be eliminated.

In the illustrated embodiment, multiple reservations are maintained (one per bank). In other embodiments, as few as one reservation may be maintained. More reservations may be maintained, as desired. Furthermore, if multiple reservations are maintained, they may not necessarily be assigned to banks as in the present embodiment.

Figure 4:
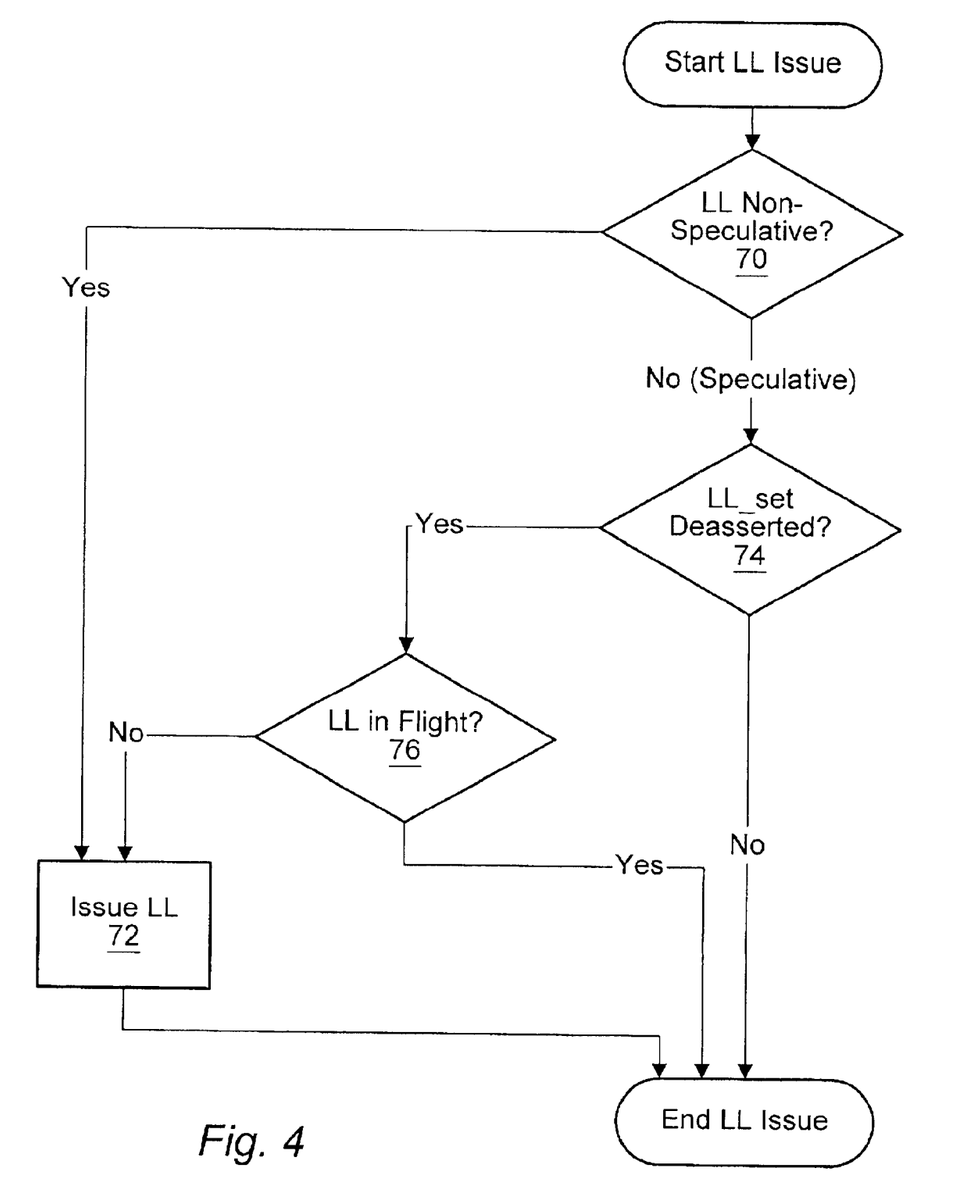
FIG. 4 is a flowchart illustrating operation of one embodiment of issue logic in the processor shown in FIG. 1 for issuing load-linked (LL) instructions.

Turning next to FIG. 4, a flowchart is shown illustrating operation of one embodiment of the issue control circuit 42 for applying extra issue criteria to LL instructions. Other embodiments are possible and contemplated. While the blocks shown in FIG. 4 are illustrated in a particular order for ease of understanding, other orders may be used. The embodiment illustrated in FIG. 4 may represent the operation of circuitry in the issue control circuit 42. Thus, blocks may represent parallel operation of the circuitry rather than any particular order. Furthermore, some blocks may be independent of each other and thus may represent independent circuitry that operates in parallel.

If the LL instruction is non-speculative (decision block 70), the LL instruction may be issued (block 72). If the LL instruction is speculative, the LL instruction may be issued if the LL_set signal is deasserted (decision block 74) and no LL instructions are in flight (decision block 76). Otherwise, the LL instruction is not issued.

As used herein, an instruction may be speculative if its control dependencies are not yet resolved. That is, if preceding instructions may cause the instruction not to be executed and its results committed, the instruction is speculative. Preceding branch instructions may be mispredicted, meaning that the instruction is not in the correct execution path and thus is not executed. A preceding instruction may experience an exception, thus causing the instruction to be canceled and execution to proceed to an exception vector. A preceding instruction may be replayed, thus causing the instruction to be canceled and reexecuted subsequently. For the present embodiment, an instruction may be speculative if any preceding instructions have not yet reached the graduation stage of the pipeline.

Figure 5:
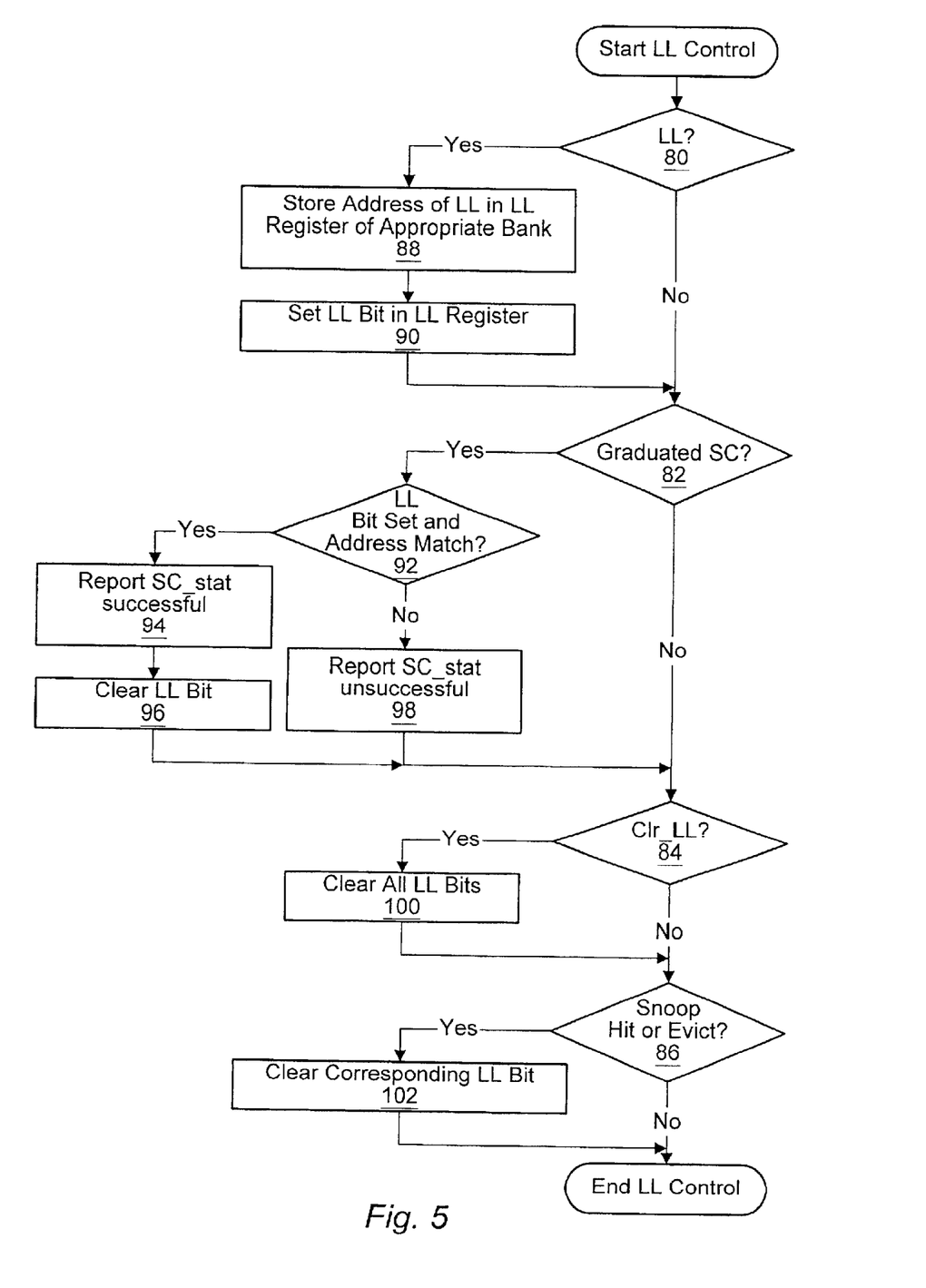
FIG. 5 is a flowchart illustrating operation of one embodiment of a LL control circuit shown in FIG. 3.

Turning now to FIG. 5, a flowchart is shown illustrating operation of one embodiment of the LL control circuit 56. Other embodiments are possible and contemplated. While the blocks shown in FIG. 5 are illustrated in a particular order for ease of understanding, other orders may be used. The embodiment illustrated in FIG. 5 may represent the operation of circuitry in the LL control circuit 56. Thus, blocks may represent parallel operation of the circuitry rather than any particular order. Furthermore, some blocks may be independent of each other and thus may represent independent circuitry that operates in parallel. For example, the decision blocks 80, 82, 84, and 86 (and blocks on the yes legs thereof) may each represent independent circuitry which operates in parallel.

If the LL control circuit 56 receives an LL instruction (decision block 80), the LL control circuit 56 updates the reservation register 58A–58D corresponding to the bank accessed by the LL instruction. Specifically, the LL control circuit 56 may store the PA of the LL instruction in the reservation register (block 88) and sets the LL bit in that register (block 90).

If the LL control circuit 56 receives a graduated SC instruction (an SC instruction which has passed the graduation stage) (decision block 82), the LL control circuit compares the address of the SC instruction to the address in the reservation registers 58A–58D and checks the corresponding LL bit (decision block 92). If the addresses match and the LL bit is set, the LL control circuit 56 reports a successful SC via the SC_stat indication (block 94) and clears the LL bit in the register for which the addresses matched (block 96). If the addresses do not match or the LL bit is clear, the LL control circuit 56 reports an unsuccessful SC via the SC_stat indication (block 98).

If the LL control circuit 56 receives an asserted Clr_LL indication from the issue control circuit 42 (decision block 84), the LL control circuit 56 clears all the LL bits in the reservation registers 58A–58D (block 100). Finally, if a snoop hit is detected (the snoop address matches a reservation address in one of the reservation registers 58A–58D and the type indicates that an update may be performed by another master) or an evict address matches a reservation address (decision block 86), the LL control circuit 56 clears the LL bit in the corresponding reservation register 58A–58D (block 102).

Figure 6:
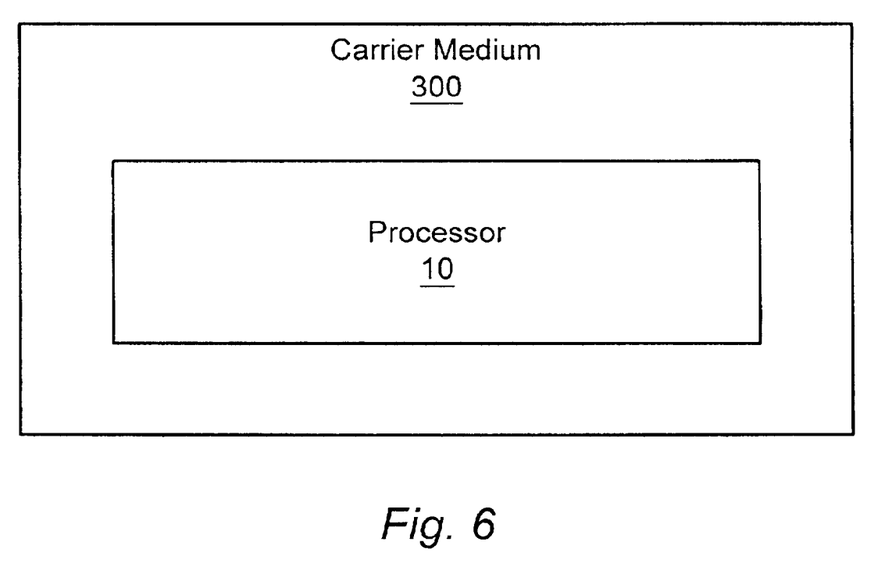
FIG. 6 is a block diagram of one embodiment of a carrier medium.

Turning next to FIG. 6, a block diagram of a carrier medium 300 including one or more data structures representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structures) of the processor 10 carried on carrier medium 300 may be read by a program and used, directly or indirectly, to fabricate the hardware comprising the processor 10. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the processor 10. The netlist(s) may then be placed and routed to produce one or more data set(s) describing geometric shapes to be applied to masks. The masks may then be used in various semiconductor fabrication steps to produce a semiconductor circuit or circuits corresponding to the processor 10. Alternatively, the data structure(s) on carrier medium 300 may be the netlist(s) (with or without the synthesis library) or the data set(s), as desired.

While carrier medium 300 carries a representation of the processor 10, other embodiments may carry a representation of any portion of processor 10, as desired, including a fetch/decode/issue unit 14, one or more load/store units 28A–28B, load/store pipelines 50, issue control circuit 42, issue queue 40, LL control circuit 56, reservation registers 58A–58D, LL_set circuits 60, etc.

Numerous variations and modifications will become apparent to those skilled in the art once the above disclosure is fully appreciated. It is intended that the following claims be interpreted to embrace all such variations and modifications.

What is claimed is:

1. A processor comprising:
    a first circuit configured to provide a first indication of whether or not at least one reservation is valid in the processor, wherein a reservation is established responsive to processing a load-linked instruction, wherein a load-linked instruction is a load instruction that is architecturally defined to establish the reservation, and wherein a valid reservation is indicative that one or more bytes indicated by the target address of the load-linked instruction have not been updated since the reservation was established; and
    a second circuit coupled to receive the first indication;
    wherein the second circuit is configured to select for issue, responsive to the first indication indicating no valid reservation, a speculative load-linked instruction; and
    wherein the second circuit is configured not to select the speculative load-linked instruction for issue responsive to the first indication indicating the at least one valid reservation.

2. The processor as recited in claim 1 wherein the first circuit comprises a pipeline for processing load instructions, wherein the second circuit is configured not to select the speculative load-linked instruction if a load-linked instruction is in the pipeline, even if the first indication indicates no valid reservation.

3. The processor as recited in claim 1 wherein the first circuit includes a first storage device configured to store a target address of a load-linked instruction and a reservation indication, wherein the reservation indication is indicative, in a first state, that a reservation is valid for the target address stored in the storage device and wherein the reservation indication is indicative, in a second state, that the reservation is not valid for the target address stored in the storage device.

4. The processor as recited in claim 3 wherein the first circuit is configured to store the target address in the first storage device responsive to the speculative load-linked instruction, and wherein the first circuit is further configured to place the reservation indication in the first state responsive to the speculative load-linked instruction.

5. The processor as recited in claim 4 wherein the first storage device is one of a plurality of storage devices, each configured to store a target address and a reservation indication.

6. The processor as recited in claim 5 further comprising a data cache including a plurality of banks, wherein each of the plurality of storage devices is associated with a different one of the plurality of banks.

7. The processor as recited in claim 6 wherein the first circuit is configured to store the target address of the speculative load-linked instruction into one of the plurality of storage devices corresponding to the one of the plurality of banks accessed by the speculative load-linked instruction, and wherein the first circuit is further configured to place the reservation indication in the one of the plurality of storage devices into the first state.

8. The processor as recited in claim 4 wherein the first circuit, in response to the speculative load-linked instruction not completing execution, is configured to place the reservation indication into the second state.

9. The processor as recited in claim 8 wherein the speculative load-linked instruction does not complete execution if the speculative load-linked instruction is replayed.

10. The processor as recited in claim 8 wherein the speculative load-linked instruction does not complete execution if a preceding branch instruction is redirected.

11. The processor as recited in claim 8 wherein the speculative load-linked instruction does not complete execution if the speculative load-linked instruction experiences an exception.

12. The processor as recited in claim 8 wherein the speculative load-linked instruction does not complete execution if a preceding instruction experiences an exception.

13. A method comprising:
    determining whether or not at least one reservation is valid in a processor;
    responsive to no valid reservation, selecting a speculative load-linked instruction for issue, wherein a reservation is established responsive to processing a load-linked instruction, and wherein a load-linked instruction is a load instruction that is architecturally defined to establish the reservation, and wherein a valid reservation is indicative that one or more bytes indicated by the target address of the load-linked instruction have not been updated since the reservation was established; and
    responsive to at least one valid reservation, not selecting the speculative load-linked instruction for issue.

14. The method as recited in claim 13 further comprising not selecting the speculative load-linked instruction if a load-linked instruction is in a pipeline of the processor, even if the determining indicates no valid reservation.

15. The method as recited in claim 13 wherein the processor includes a first storage device configured to store a target address of a load-linked instruction and a reservation indication, wherein the reservation indication is indicative, in a first state, that a reservation is valid for the target address stored in the storage device and wherein the reservation indication is indicative, in a second state, that the reservation is not valid for the target address stored in the storage device, the method further comprising:
    storing the target address in the first storage device responsive to the speculative load-linked instruction; and
    placing the reservation indication in the first state responsive to the speculative load-linked instruction.

16. The method as recited in claim 15 wherein the first storage device is one of a plurality of storage devices, each configured to store a target address and a reservation indication, and wherein the processor includes a data cache including a plurality of banks, wherein each of the plurality of storage devices is associated with a different one of the plurality of banks, wherein the storing is performed to one of the plurality of storage devices responsive to which of the plurality of banks is accessed by the speculative load-linked instruction.

17. The method as recited in claim 15 further comprising, in response to the speculative load-linked instruction not completing execution, placing the reservation indication into the second state.

18. A carrier medium comprising one or more data structures representing a processor comprising:
    a first circuit configured to provide a first indication of whether or not at least one reservation is valid in the processor, wherein a reservation is established responsive to processing a load-linked instruction, wherein a load-linked instruction is a load instruction that is architecturally defined to establish the reservation, and wherein a valid reservation is indicative that one or more bytes indicated by the target address of the load-linked instruction have not been updated since the reservation was established; and a second circuit coupled to receive the first indication;

wherein the second circuit is configured to select for issue, responsive to the first indication indicating no valid reservation, a speculative load-linked instruction; and wherein the second circuit is configured not to select the speculative load-linked instruction for issue responsive to the first indication indicating the at least one valid reservation.

19. The carrier medium as recited in claim 18 wherein the first circuit comprises a pipeline for processing load instructions, wherein the second circuit is configured not to select the speculative load-linked instruction if a load-linked instruction is in the pipeline, even if the first indication indicates no valid reservation.

* * * * *